United States Patent
Aldred et al.

(10) Patent No.: US 6,278,693 B1
(45) Date of Patent: *Aug. 21, 2001

(54) COMMUNICATIONS SYSTEMS WITH QUALITY OF SERVICE PARAMETERS

(75) Inventors: Barry Keith Aldred, Winchester; Howard Shelton Lambert, Southampton; Harry David Mitchell, Richmond-upon-Thames; David Seager Renshaw, Winchester, all of (GB)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/823,400

(22) Filed: Mar. 24, 1997

(30) Foreign Application Priority Data

Apr. 24, 1996 (GB) ................................................ 96084348

(51) Int. Cl.[7] .................................................... H04J 3/00
(52) U.S. Cl. .................... 370/252; 370/232; 370/238; 370/230
(58) Field of Search ................................ 370/238, 252, 370/230, 232, 396, 410, 253

(56) References Cited

U.S. PATENT DOCUMENTS

| Re. 34,034 |   | 8/1992  | O'Sullivan ........................ 379/59 |
| 5,070,498  |   | 12/1991 | Kakuma ........................... 370/60 |
| 5,153,877  |   | 10/1992 | Esaki ............................. 370/94.1 |
| 5,291,481  | * | 3/1994  | Doshi et al. ..................... 370/410 |
| 5,315,586  | * | 5/1994  | Charvillat ........................ 370/396 |
| 5,335,222  |   | 8/1994  | Kamoi ............................. 370/60 |
| 5,357,507  |   | 10/1994 | Hughes ............................ 370/60 |
| 5,408,465  |   | 4/1995  | Gusella ........................... 370/17 |
| 5,434,848  |   | 7/1995  | Chimento ......................... 370/17 |
| 5,491,690  | * | 2/1996  | Alfonsi et al. ................... 370/238 |
| 5,519,689  | * | 5/1996  | Kim ............................... 370/232 |
| 5,530,695  | * | 6/1996  | Dighe et al. ..................... 370/232 |
| 5,581,544  | * | 12/1996 | Hamada et al. .................... 370/253 |
| 5,675,573  | * | 10/1997 | Karol et al. ..................... 370/230 |
| 5,703,870  | * | 12/1997 | Murase ............................ 370/232 |
| 5,713,043  | * | 1/1998  | Baugher et al. ................... 370/232 |
| 5,734,646  | * | 3/1998  | I et al. .......................... 370/252 |
| 5,745,480  | * | 4/1998  | Behtash et al. ................... 370/252 |

FOREIGN PATENT DOCUMENTS

| 583965     | 2/1994  | (EP) . |
| 621704     | 10/1994 | (EP) . |
| 625838     | 11/1994 | (EP) . |
| 632672     | 1/1995  | (EP) . |
| 658999     | 6/1995  | (EP) . |
| A-2285196  | 1/1995  | (GB) . |
| WO95/08230 | 3/1995  | (WO) . |
| WO95/08882 | 3/1995  | (WO) . |

OTHER PUBLICATIONS

'Integrated Packet Networks with Quality of Service Constraints' IEEE Global Telecom Conf. '91, Phoenix, AZ, Dec. 2–5, 1991, vol. 1, pp. 223–227, W C Lee and P Kamat.

'Internetworking with TCP/IP' vol. 1: S7.7.2, Douglas E. Comer.

* cited by examiner

Primary Examiner—Brian Zimmerman
(74) Attorney, Agent, or Firm—Jerry W. Herndon

(57) ABSTRACT

A communications system may be used for transmitting and/or receiving data over a network. The communications system includes means responsive to requests for a desired quality of service specifying at least two quality of service parameters, such as bandwidth, latency, error rate, and so on, for determining whether or not the requested quality of service is available. The quality of service requests specify the desired quality of service in terms of logical expressions involving two or more of said at least two quality of service parameters. This allows, for example, a desired quality of service to accept a higher error rate if the available bandwidth is higher. In the preferred embodiment, each quality of service parameter is specified in terms of a range between minimum and a maximum acceptable values.

26 Claims, 1 Drawing Sheet

COMMUNICATIONS SYSTEMS WITH QUALITY OF SERVICE PARAMETERS

BACKGROUND OF THE INVENTION

The present invention relates to communications systems, and in particular to the quality of service provided by such a communications system.

Communication systems are conventionally divided into two main forms. In the first of these, referred to as a circuit switched system, a dedicated line is provided for a communication between two end terminals (note that it may be possible to multiplex a plurality of such lines onto a given physical communications link). The effect of this is to assign a certain chunk of the network bandwidth to the communication. The most prominent example of a circuit switched system is the conventional telephone network. The drawback with this approach is that it does not maximise bandwidth usage of the network. For example, a telephone call still has bandwidth assigned to it even during periods when the parties at each end are both silent, and so no useful data is being transferred.

The second main type of communications system is known as a packet-switched system. In such a network, information to be transmitted is formed into blocks of data known as packets, which are then presented to the communications system for delivery to their destination. In general no bandwidth is pre-assigned to any particular user, rather the packets compete for available bandwidth. The implication of this is that a network can transmit additional packets whenever network bandwidth is not being fully utilised. The result of this is that bandwidth usage is optimised compared to a circuit switched network, which runs out of capacity when all its bandwidth is assigned (as opposed to being actually utilised).

A packet switched system in some ways is similar to a road network, with the packets being equivalent to the cars on the roads. In both types of network, problems arise when network traffic starts to approach or exceed network capacity, resulting in a backlog of traffic—ie queues. It is therefore important when designing a packet switched system to try to ensure that network capacity will not be exceeded.

Computer communications often have extremely variable bandwidth requirements; eg two computers may exchange a large file, requiring significant network capacity, followed by a period of no data exchange. Such properties normally render circuit switched systems unsuitable for computer communications, since assigned bandwidth would be idle for a relatively high proportion of time. Therefore computer communications have usually been implemented over packet-switched networks.

The designers of such packet switched networks have generally planned the capacity of such networks based on a statistical understanding of the average level of communications. The implication of this is that during peak levels of communications, the network may have insufficient capacity to transmit all packets, resulting in queue formation as described above. Of course, the network could in principle be provided with sufficient capacity to handle the peaks, but then a large chunk of bandwidth would be idle when communications were only at an average level (the overall network efficiency would then be poor, as for circuit-switched networks).

Traditional computer communications have not been too severely impacted by delays in data transmission caused by peaks in network traffic; the precise arrival time of a data file transmitted from one computer to another is not normally too important. However, more recently there has been considerable interest in using computer networks for the transmission of multimedia data, in particular sound and video. A particular example of this is the desire to be able to transmit sound/video information across the Internet/Worldwide Web. Contrary to the traditional forms of computer communications, such multimedia data is very sensitive to network delays, especially the sort of variable delays (often referred to as "jitter") which are common on a packet-switched network. This is because multimedia systems output data in real-time at a constant rate (they are "isochronous"). Therefore, if a packet containing the next piece of sound or video is delayed too much, then the multimedia system may exhaust its supply of data, producing an interruption in the sound or video. Such an interruption can seriously degrade the quality of the multimedia output; too many interruptions can render the sound/video output totally useless or unintelligible.

There has been considerable work on how to overcome the above problems in order to allow effective multimedia communications over packet switched networks. Some of this development has concentrated on optimising processing at the receiving terminal (see eg U.S. Pat. No. 5,404,446). Another very important strategy has been to introduce some form of bandwidth allocation, conceptually equivalent to simulating a circuit-switched connection on top of a packet-based network (see eg EPA 625838).

It can be seen therefore that the bandwidth available on the network and the jitter suffered by packets traversing the network represent important parameters describing network performance. These parameters are of great significance to a user or application wishing to use the network for data transmission.

There are other parameters relating to the network which are also very important. One of these is latency, which represents the mean end-to-end delay for data transmissions across the network. Latency is likely to be high when a data packet is processed by lots of intermediate nodes in a network on its way to its destination. High latency is particularly deleterious in real-time communications, eg sound or video conferencing, where a long delay can prevent natural interaction. Note that this difficulty also exists in circuit switched networks where the transmission path is excessively long, as is perhaps the case with trans-atlantic telephone calls routed by satellite.

Another parameter reflecting network performance is error rate, which represents the number of errors in the received data stream compared to the original. Potential errors include an incorrectly received bit, perhaps due to noise on the transmission line, or a lost packet, perhaps due to a network failure, or to excessive network congestion resulting in queue overflow and packet loss at an intermediate node in the network. U.S. Pat. No. 4,697,281 teaches reducing packet size when the error rate is high, since if the error rate is too great, the probability of a large packet being correctly received in its entirety becomes very small.

Parameters such as bandwidth, latency, error rate etc may collectively be referred to as quality of service (QoS) parameters. Many networks provide users or applications with a mechanism to indicate their desired quality of service. For example, under the Internet Protocol, datagrams contain three bits, denominated D, T, and R, which if set request low delay, high throughput, and high reliability respectively (see "Internetworking with TCP/IP; Principles, Protocols, and Architecture" by D Comer, Prentice Hall, 1988, section 7.7.4). The Internet does not guarantee to satisfy these requests, but may be influenced by them in its route selection.

Many networks provide users and applications with a rather greater degree of control of quality of service. For example, the bandwidth reservation procedure for the above-mentioned EPA 625838 can be regarded as specification of quality of service. In this case a numerical bandwidth is requested: if the network is prepared to guarantee the availability of the requested bandwidth, then the request is granted; otherwise the request is refused.

A more comprehensive approach to quality of service is described in "Integrated Packet Networks with Quality of Service Constraints" by W Lee and P Kamat, p223–227, IEEE Globecom '91. This paper describes a mechanism whereby users or applications can request quality of service for a particular parameter by specifying two values. The higher of these values represents the desired or requested value, whilst the smaller represents the lowest acceptable value. The network will then try to provide a service having the parameter within the specified range, preferably as near as possible to the requested value. If the network does not have the resources to provide such a service, it will refuse to support the service, or may try to reclaim resources from other users.

Other prior art documents which discuss quality of service provisions include U.S. Pat. No. 5,070,498, U.S. 5,432,790, U.S. 5,357,507, U.S. 5,434,848, EPA 621704, EPA 632672, WO 95/08882, U.S. Pat. No. 5,408,465 and U.S. Pat. No. 5,153,877. Many of these documents address the problems of how a network can best determine what quality of service it has available (given for example a certain network usage), and how a network can best ensure that it honors its commitments to users and applications to provide an agreed quality of service.

However, whilst the above prior art illustrates that quality of service is a very important feature of modern communications systems, and is well-understood at least in its simplest form, the inventors of the present application have nevertheless determined that existing mechanisms for controlling quality of service remain somewhat unsatisfactory. These deficiencies are becoming particularly significant, for example, in emerging communications technologies such as the transmission of multimedia data over asynchronous transfer mode (ATM) networks, where quality of service considerations are increasingly important.

SUMMARY OF THE INVENTION

Accordingly, the present invention provides a communications system for transmitting and/or receiving data over a network, said communications system including means responsive to requests for a desired quality of service specifying at least two quality of service parameters, for determining whether or not the requested quality of service is available, characterised in that said determining means is responsive to quality of service requests specifying the desired quality of service as a logical expression involving two or more of said at least two quality of service parameters.

The invention recognises that the quality of service parameters are all inter-related. For example, in a system with a high bandwidth, a high error rate may be acceptable (providing the errors are detectable), because the extra bandwidth can be used to accommodate the re-transmission of erroneous frames. The independent specification of quality of service parameters as in the prior art does not reflect this inter-dependence, and so in general cannot accurately represent the desired transmission characteristics. By contrast, the use of logical expressions, allowing for example quality of service parameters to be specified in terms of algebraic or arithmetic operations on other quality of service parameters, provides a much more flexible and powerful mechanism for defining quality of service requests. This in turn ensures that the requested quality of service more closely aligns with the quality of service that is actually necessary for the intended data transmission, and so helps to improve overall efficiency of network usage.

Typically said quality of service requests are received from applications intending to initiate data communications over said network. The determining means then compares the requested quality of service parameters with the facilities provided by the communications link(s) available to the communications system. If a match is obtained, then the requested transmission can be accepted, otherwise it must be refused.

In the preferred embodiment both the requested and available quality of service specifications are written in a pseudo-computer language (based on Pascal in the preferred embodiment). The determining means compiles the requested and available quality of service specifications, and then runs them on an iterative basis to determine whether or not they match. The compiled specifications are machine-independent, and are run using a machine-dependent interpreter.

Also in the preferred embodiment, each requested quality of service parameter is represented as a pair of values corresponding to the minimum and maximum of the desired range for that parameter. It will be appreciated that in theory one might wish to specify additional information about each quality of service parameter, such as quartile figures, or even the complete desired distribution, but in general this is prohibitive in terms of the necessary mathematical and computational processing. The use of minimum/maximum pairs provides more effective control than the use of a single target figure for example, whilst still allowing the quality of service analysis to be performed quickly and efficiently.

The determining means compares the facilities provided by the communications link(s) available to the communications system with the requested quality of service parameter ranges, to check whether the available resources lie within (ie partially overlap at least) the range for each desired parameter. In the preferred embodiment, this comparison is performed by alternately running the quality of service specifications for the requested and available quality of service until convergence is obtained. This procedure resolves any logical expressions used to specify quality of service; for example, the desired rate or bandwidth may depend on the frame size used, which may be effectively determined by the available communication link. Assuming that the desired quality of service can be satisfied by the available quality of service, an agreed range is produced for each quality of service parameter, effectively representing the overlap of the desired and available ranges for that parameter (note that the agreed range may have zero width—ie the minimum and maximum limits have the same value).

Preferably the communications system further includes means for monitoring communications to ensure that they conform to the agreed range for each quality of service parameter. If an excursion is detected, an error message can be sent to the application which is responsible for the communications link, to allow appropriate action to be taken. Also the communications system may try itself to take remedial action; for example assigning a higher priority to the relevant communications. Note that since the monitoring operation is being continuously performed, it is particularly advantageous to use the compiled form of the quality of service specification, since this can be processed very quickly.

It will be appreciated that many other techniques could be used to match the requested and available resources with each other, besides the code interpretation approach described above. For example, the resource manager may try to select by simple trial and error link characteristics which match both the requested and available specifications; alternatively some form of mathematical searching and optimisation algorithm might be used.

In the preferred embodiment said determining means further comprises means, responsive to a quality of service request which relates to a route that spans more than one communications system in said network, for communicating with said more than one communications systems, in order to obtain an overall determination of whether the quality of service request can be satisfied. Thus in the preferred embodiment control of communications resources is distributed across the network, with each node or terminal being responsible for its local links. Therefore, in order to determine whether a requested quality of service can be provided over a route which spans multiple nodes, the request is propagated along the route, and each node in the route compares the requested quality of service with its available resources for the local part of the route. The requesting node then receives responses back from the other nodes in the route, to allow an overall determination to be made as to whether or not the desired route can provide the requested quality of service (it will be recognised that in some situations the requested quality of service might be satisfied by splitting the data transmissions across multiple routes to the same destination).

In situations where the network is heterogeneous, it is particularly advantageous to propagate the quality of service specification in a machine-independent form. It is then assumed that each node in the network has the appropriate interpreter in order to run the quality of service specification. Note that in a homogeneous network it would alternatively be possible not to use an interpreter, but rather to propagate a directly executable version of the quality of service specification.

It will be appreciated that the invention is also applicable to networks with centralised resource control facilities, for example where a single node is responsible for receiving and approving all quality of service requests.

Typically said quality of service parameters include parameters such as the data transmission rate, latency, error rate and so on; in other words, potentially any parameters which are useful for ensuring that the communications facilities provided are suitable for the intended data transmission (eg audio conferencing, file data transfer, video servers, etc). Note that the quality of service parameters may also perhaps include those relating to machine performance, such as a requested proportion of CPU time, in order to ensure completely that the desired performance is obtained.

The invention further provides a method for processing requests for a desired quality of service in a communications system for transmitting and/or receiving data over a network, including the steps of receiving desired quality of service requests specifying at least two quality of service parameters, and determining whether or not the requested quality of service is available, characterised in that said determining step is responsive to quality of service requests specifying the desired quality of service as a logical expression involving two or more of said at least two quality of service parameters.

The invention further provides a system for transmitting and/or receiving data over a network, said system including means for requesting from a communications control system a desired quality of service specifying at least two quality of service parameters, said communications control system determining whether or not the requested quality of service is available, characterised in that said system provides quality of service requests specifying the desired quality of service as a logical expression involving two or more of said at least two quality of service parameters. Such a system is typically an application program running on a computer workstation, which interacts with the communications control system to set up and maintain communications with another application program on a remote system.

BRIEF DESCRIPTION OF THE DRAWINGS

A preferred embodiment of the invention will now be described in detail by way of example only with reference to the following drawings.

DETAILED DESCRIPTION OF THE INVENTION

Figure 1:
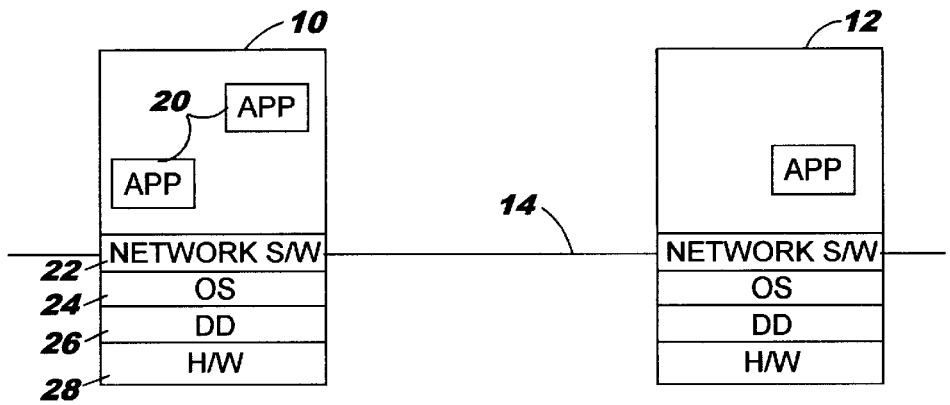
FIG. 1 is a schematic diagram of two workstations connected by a communications link.

FIG. 1 is a schematic diagram of two workstations 10, 12 connected by a communications link 14. Each workstation 10, 12 comprises hardware 28, such as an IBM Personal Computer system, and may include an adapter card for interfacing to communications line 14. For example, if line 14 is provided as part of a local area network (LAN), then each workstation may have a Token Ring adapter card. As is well-known in the art, the workstation typically supports an operating system (OS) 24, together with device drivers 26 appropriate to the system hardware. The workstation also includes networking software 22, which may be provided as part of the operating system, to allow communications over line 14, whilst overall control of the workstation is provided by an application 20. There may be multiple applications running at any given workstation.

It will be appreciated that the arrangement shown in FIG. 1 is well-known to the skilled person, and that many variations are possible in terms of the nature of the both the terminals and the communications link. For example, the terminals may be any suitable form of computer, or potentially even some other data communications device, perhaps for example a telephone with advanced functions, or an Internet access and communications device. Likewise, the communications link may be any suitable form of network capable of providing. data transmission, such as LAN, ISDN, ATM and so on. Note also that each terminal may support a plurality of network connections.

Figure 2:
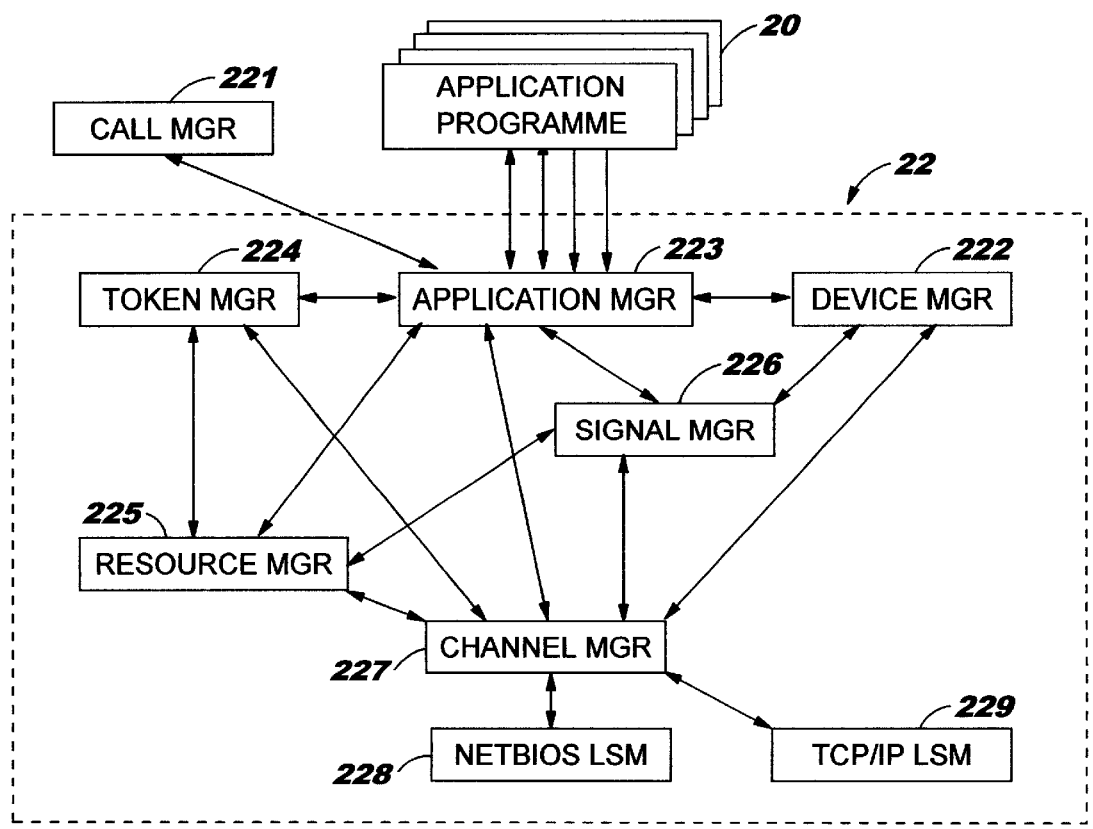
FIG. 2 illustrates the components of the networking software running on the workstations.

FIG. 2 illustrates the components of the networking software 22 in the preferred embodiment in greater detail. The application manager 223 acts as an interface between an application program 20 and the networking software, whilst the channel manager 227 is responsible for setting up and taking down channels (logical links) to other nodes or terminals. Underneath this two link support modules (LSMs) 228, 229 provide an interface between the channel manager and the device drivers 26 (note that Netbios and TCP/IP are two well-known communications protocols). The resource manager 225 controls network resources and quality of service issues, as discussed in more detail below. The device manager 222 is responsible for managing interactions between the networking software and any physical devices attached to the workstation, for example to resolve device names to fully qualified paths, whilst the token manager 224 is responsible for the handling of tokens, both local and global across the network. The call manager 221 is used to authorise or reject incoming/outgoing calls, whilst the signal manager 226 is used for generating signals from the networking software to the application. Further details about the networking software in the preferred embodiment can be found in WO94/11813 and GB 2289186.

Considering now the resource manager 225 in more detail, this component controls access to network resources, such as bandwidth etc, and is also used for route selection, and interfacing to any address books. Of particular importance to the present application, the resource manager is further responsible for handling quality of service issues. Thus an application, when making a request for a particular channel to be established to another node, may specify the quality of service parameters which it desires or requires for that channel. The resource manager maintains a record of currently available resources, so that it can determine whether or not each request can be satisfied.

It will be appreciated that at this superficial level such management of quality of service is known in the art. For example, the prior art contemplates an application requesting a communications channel having a particular bandwidth and error rate. However, hitherto no allowance has been made for the fact that in fact such quality of service parameters are inter-dependent. For example, if the error rate is high, necessitating a large number of re-transmissions, then the bandwidth required to achieve a certain net data rate must be increased in order to accommodate the re-transmissions. The present invention recognises the importance of this inter-dependence of network parameters, as will now be described.

In the preferred embodiment, the following quality of service parameters are utilised:

| | |
|---|---|
| Error: | Frame error rate (eg in units/second) |
| Cost: | Cost (eg in dollars/second) |
| Duration: | Length of time the channel will exist (eg in seconds) |
| Retry: | Number of error retry attempts |
| Size: | Unit or frame size (eg in bytes) |
| Jitter: | Jitter (eg in milliseconds) |
| Latency: | Latency (eg in milliseconds) |
| Rate: | Throughput (eg in units/second) |

In general, each quality is specified as a minimum/ maximum value pair, eg Rate[min,max], which can be considered as somewhat analogous to the desired/acceptable pairings in the above-mentioned paper by Lee and Kamat. Note that for some parameters, such as latency, which are preferably as low as possible, the minimum value will represent the desired figure, whilst the maximum value will represent the highest acceptable figure. Correspondingly, for those parameters, such as rate, which are preferably as high as possible, the converse will apply. In the preferred embodiment, a value pair specifying only a single figure can be interpreted as having both minimum and maximum values equal to this figure.

Optionally, a special meaning can be given to the Retry parameter, such that Retry(min)=0 implies ignore errors, whilst Retry(min)>0 implies raise an error event if an error is detected. Retry(max) can then be used to specify the number of re-transmit attempts before an error action is taken.

It is not necessary to use the exact list of quality of service parameters presented above. Other communications systems may use different sets of parameters, perhaps a subset of those above, of perhaps including different parameters. Also, the definition of the parameters may be slightly varied, for example Error might be defined as the percentage of frames which were not received correctly. However, for many networks the above listing will allow an accurate determination to be made of the technical and economic feasibility of communication over a particular channel.

In order to allow for the inter-dependence of the different quality of service parameters, a parameter may be expressed as an algebraic function of one or more other parameters. A somewhat arbitrary example of a quality of service specification might therefore be as follows:

TABLE 1

| | |
|---|---|
| Size=[512,1024] | |
| Rate=Size/32 | (=[16,32] |
| Latency=(Rate*1000)/8 | (=[2000,4000] |
| Jitter=Latency[min]/10 | (=[200,200] |
| Error=Rate/16 | (=[1,2] |
| Retry=0 | (=[0,0] no error retry |

Perhaps a more realistic example (although the numbers have obviously been chosen to work out simply) is as follows:

TABLE 2

| | |
|---|---|
| Size=[512,1024] | |
| Rate[min]=8192/Size[Min] | (Rate=[16,?] |
| Latency[Max]=240 | (Latency=[0,240] |
| Jitter[Max]=80 | (Jitter=[0,80] |
| Error[Max]=Rate[Min]/16 | (Error=[0,1] |
| Retry=0 | |
| Rate[Max]=8192/(Size [Max] * (Jitter[Max]*2)/1000) | |
| (Rate=[16,50] | |

Note that we have assumed that initially each parameter is set to [0,?], where the "?" for the upper limit indicates that this is not restricted (ie any value above the minimum level is acceptable). Alternatively, each parameter could initially be set to [0,0], with updates to the minimum value producing an equivalent change to the maximum value automatically, whilst another possibility is to allow the initial values to be undefined, and use some suitable default handling.

The motivation behind the expressions given above for the quality of service parameters, which are very roughly modelled on those needed for a single audio channel, is as follows. Firstly, the Size might be specified to avoid the processing inefficiencies associated with having very many small frames, or a few very large frames. Next, the minimum Rate is selected to ensure that the overall bandwidth in terms of bytes per second is greater than 8192 (the throughput in bytes per second is obtained by multiplying the Size, the number of bytes per frame, by Rate, the number of frames per second). Maximum values for latency and jitter are specified to allow for an acceptable audio output. The maximum error rate is then defined to ensure that the percentage error rate is no more than 1/16 (ie 6.25%), with no repeat transmission in the case of errors.

Finally, assuming that buffering is used to compensate for jitter (both positive and negative), and that 8192 bytes of buffer space are available, this can be used to set the maximum for Rate—any higher and the buffer would risk over-flowing with the loss of data.

In the preferred embodiment, a simple language is defined for the manipulation of the quality of service parameters, which allows for variables and constants (the quality of service parameters themselves are variables). Conventional arithmetic operations are provided—addition, subtraction, multiplication, division, plus a remainder function—along with control flow constructions (if . . . then . . . else), including normal logical tests (less than, equals, greater than, etc). Since the algebra is predominantly defined with respect to value pairs, the preferred embodiment includes logical tests for determining whether one range is exclusive or inclusive of another range.

As indicated previously, the resource manager in the network software is responsible for receiving a quality of service request from an application, which is algebraically specified as per the above examples. The resource manager then has to match the quality of service request against the available communications resources to determine whether or not the request can be satisfied or rejected.

In the preferred embodiment, the communications resources are specified in the same language as the quality of service requests. In general, there is a separate specification for each link support module (LSM), in other words for each communications line. A simple link may perhaps have the following specification:

TABLE 3

| Size=[32, 512] | |
| Rate[Max]=100 | (Rate=[0,100]) |
| Latency[Max]=64+(Size[Max]/8)] | (Latency=[0,128]) |
| Jitter[Max]=40 | (Jitter=[0,40]) |
| if Duration[Min] > 100 then | |
|     Cost=8 | |
| else | |
|     Cost=10 | |

In this case the latency scales with the frame size, reflecting the delay associated with waiting for a frame to be completed before transmission. Note the use of a logical expression for the charging structure, such that calls which are guaranteed to be longer than a minimum Duration obtain a discount. Note also that Cost is defined as a single value (ie the minimum and maximum costs are identical). The implication of this is that the charging rate is fixed (for a given Duration).

In fact, the expression used produces the slight anomaly that the cost of calls lasting over a 100 seconds is less than the cost of calls lasting say 90 seconds. This can be avoided if a more complex expression is used for the charging formula, for example:

if Duration[Min]>100 then
    Cost=(1000+(8*(Duration−100)))/Duration
else
    Cost=10

It will be recognised that the quality of service specifications in Tables 1 and 2 allow all numerical ranges to be deduced for the relevant parameters. In this case, it would be possible to calculate the numerical ranges upfront, and simply specify these as a set of min/max pairs. In other words, Table 1 would be replaced by:

Size=[512,1024]
Rate=[16,32]
Latency=[2000,4000]
Jitter=[200,200]
Error=[1,2]
Retry=[0,0] no error retry Although this leads to the same quality of service specification, it has the disadvantage that if one of the quality of service parameters is altered (eg the range of permissible Size is increased), then all the other parameters must be altered by hand. By contrast, by using logical/algebraic expressions to link the different parameters as in Table 1, then if one parameter is updated, then all the remaining parameters are effectively automatically updated as well.

Moreover, it should be appreciated that the quality of service parameters do not necessarily resolve, at least initially, into fixed numerical ranges. For example, the parameter specifications in Table 3 do not limit Cost; rather they simply define a relationship between Cost and Duration. This relationship is employed if a requesting application has a limitation on Cost for example, in which case a maximum Duration value can then be determined. This sort of flexibility has not been available in the prior art.

So far we have considered how an algebraic quality of service language can be used for an application specifying its requested service parameters, and for a communications facility specifying its available service parameters. In the preferred embodiment it is the responsibility of the resource manager to determine whether the available parameters allow the requested parameters to be satisfied (alternatively either the application or an LSM might do this, providing they had access to the relevant specifications).

There are several approaches that might be employed for this determination. One possibility is to search through the available parameter space in order to determine acceptable ranges. The search strategy could range from the simplest trial and error approach, through techniques such as genetic algorithms, to some form of mathematical optimisation (such as linear programming perhaps).

However, the preferred embodiment uses a somewhat different approach, which will now be described. Essentially, the requested and available parameter specifications are regarded as programs, and are run. If we use the requested parameters from Table 2 and the available parameters from Table 3, initially "running" the specification of Table 2 results in the numerical ranges specified in the final column of Table 2. These are then used as inputs to the available parameter specification of Table 3 to produce the following set of parameter specifications:

TABLE 4

Size=512
Rate=[16, 50]
Latency=[0, 128]
Jitter=[0, 40]
Cost=10
Error=[0,1]

The above values are readily explained as follows. Initially we have Size=[512, 1024] from Table 2, but reconciling this with Size=[32, 512], leads to a single possible Size=512. Jitter is similarly restricted from the broad range of Table 2 to the narrower range of Table 3. The Latency values are recalculated given the new Size values, although in the event do not change. Cost is set 10, since Duration is undefined, whilst the values for Error are simply carried through unchanged.

A second iteration is performed, which in fact does not alter the above values. For example, Rate[Max] is recalculated using the specification of Table 2 again, but using the values of Size and Jitter taken from Table 4. However, since this new value of Rate[Max] is greater than the existing value, it is discarded. The execution of the parameter specifications then terminates, given that convergence has been obtained.

The above sets of parameter specifications converged relatively easily. A slightly more complex example would be for example if the specification for Table 2 omitted a Size value. This would leave certain parameters, such as Rate for example, undefined, until the first pass through the available parameters of Table 3. The expressions of Table 2 would then effectively not be applied until the second iteration, requiring at least three iterations to detect convergence.

Of course, if a clear conflict is detected between the requested and available parameters (eg if requested Size is [512, 1024] and available size is [32, 128]), then the requested resources cannot be provided, and the communications request must be rejected. It is conceivable that there may be a failure to converge within a predetermined number of iterations. This may be taken as an indication that the requested resources should be rejected, or alternatively a different technique might be adopted to try to match the requested and available resources.

If there are matching ranges from both the application and LSM for all quality of service parameters, then the resource manager indicates that transmission can proceed. Note that generally, the resource manager does not try to restrict parameters to a single value within the overlapping range. For example, if an application requests a Latency of less than 300 ms, and the LSM provides a Latency of greater than 100 ms but less than 400 ms, then transmissions commence, with the resource manager simply specifying a latency of 100–300 ms.

Of course, in some situations, the resource manager may have to chose actual values (at least nominally) for the parameters. Consider, for example, an ISDN connection, which provides 64 kbytes/second per B channel. The resource manager may be able to select whether to use 1 or 2 B channels, for example by trying to match as closely as possible the maximum, minimum, or middle of the range as appropriate.

After a communications link has been set up, then it is the responsibility of the resource manager to monitor the actual performance of the link, to ensure that it stays between the maximum/minimum specified values for that link. Thus the instantaneous rate, jitter, latency etc are measured, and compared to the agreed quality of service parameters. If one of the parameters strays outside the defined range, then an appropriate error message can be sent to the application. Note that the instantaneous values can be determined at regular time intervals, or after a certain amount of data has been received, or on any other appropriate basis.

In the preferred embodiment, the quality of service language is closely modelled on Pascal, and allows functions to be defined and called. The resource manager includes a compiler which compiles the quality of service specifications into machine independent P-code (byte codes). This byte code can then be executed by machine-specific interpretation. Note that since the quality of service language is relatively simple in terms of available operations, both the compiler and interpreter are relatively simple variants on conventional Pascal compilers/interpreters, which are well-known in the art.

As an alternative the quality of service specification might simply be taken as a data input into the resource manager program. However, the advantage of having the compiled form is that it can be processed very quickly. This is particularly important in terms of monitoring network performance, which must be done on a regular basis, possibly for multiple links, with minimum impact on the workstation processing capability.

The reason for interpreting the quality of language specification, rather than compiling it into directly executable code, is concerned with the distributed nature of the network control in the preferred embodiment. Thus each resource manager maintains information concerning local links. In order to determine whether a route comprising multiple links can be set up, route information together with quality of service information is propagated along the proposed route. This allows a cumulative analysis to be made of whether or not the route can provide the requested quality of service. This principle is described in more detail in GB 2289186, which is incorporated herein by reference.

Since the network may be heterogeneous in terms of platforms etc, it is preferred to distribute the quality of service specifications in machine-independent byte code, which can then be interpreted according to the local environment on each machine (eg whether the operating system is AIX, OS/2, or any other appropriate platform). This avoids the need for the other systems to have to re-compile the original quality of service requirements.

Note that the resource manager may be able to combine the resources from different communications links or routes in order to satisfy the desired quality of service parameters, where this is possible (which would then result of course in the relevant communications session being spread across the multiple links). Such a situation can be modelled in the quality of service language by using matrices to reflect the multiple possible routes (in an analogous manner to conventional network matrix descriptions). Further, the approach of the invention can also be used in route selection, where the quality of service specifications can be used to help score different possible routes. For example, out of the available routes which meet the physical requirements regarding errors, jitter etc, the resource manager may select the route having the lowest cost.

Although the invention has been described primarily with respect to minimum/maximum value pairs, it will be appreciated that the quality of language specification could be made using some other quantities. In the simplest case, the parameters could be single numbers, although still related by logical expressions as illustrated above. In practice, many of these numbers would be interpreted as upper limits (eg for latency, jitter, error rate, etc). However, this approach does not cater well for parameters such as bandwidth, for which it is desirable to be able to specify both minimum and maximum values.

Of course, one might prefer to be able to characterise the quality of service parameters more precisely (eg for jitter, have limits in the positive and negative directions). In fact, the ideal is to be able to specify the complete distribution function for each quality of service parameter. Note that since (as shown above) the parameters are interrelated, then this really requires defining an acceptable region of a multi-variate distribution. In general, however, this is far too complicated from a mathematical and computational perspective. The use of the minimum/maximum pairs therefore represents an effective compromise between computational feasibility and an accurate description of required quality of service.

One potential problem with the use of minimum/maximum pairs occurs when a very wide parameter range is specified, which is much larger than the degree of fluctuation expected from the network. Consider for example the transmission of an ordinary data file, where the acceptable Rate may have a very potential large range, together with the restriction that Error must be no more than one error per frame. Although a formulation analogous to that of Table 2 above can ensure that this requirement is satisfied, it results in a somewhat overly-conservative specification of Error if the actual Rate to be used lies at the lower end of the range. In this case, it may be desirable for the language to allow expressions to utilise the actual or nominal values (or ranges, if these are small) provided or selected by the resource manager, for example to allow a direct specification of an effective ratio of Error to Rate, without using minimum/maximum pairs.

It will be appreciated that the invention can be applied to a very broad range of networks; in fact, to any network which utilises quality of service constraints. Some of these networks may have centralised control of quality of service, whilst others, such as the network described here, may use a distributed approach, with each network managing its own local communication resources. Some impression of the range of possible networks can be obtained by reviewing the above list of prior art documents concerning quality of service. Note that although quality of service aspects have been mainly associated in the prior art with packet-switched rather than circuit-switched networks, the invention applies to both sorts of network (or combinations of the two). For example, the invention might be used to determine whether a standard telephone line plus modem can satisfy a requested quality of service, or whether perhaps a LAN connection would be more suitable.

Although the invention has been described with respect to quality of service parameters for network transmissions, it will be appreciated that the invention is not limited to this environment. For example, an application might also want to be able to specify a desired percentage of CPU time (or perhaps MIP or MFLOP rate), memory requirements (in kbytes, MBytes or whatever), and so on. These requirements could be included as part of the network request, for example because an application needs these facilities in order to properly process the transmitted or received data, and would also be relevant for a stand-alone workstation.

What is claimed is:

1. A communications system for transmitting and/or receiving data over a network, said communications system including means responsive to requests for a desired quality of service specifying at least two quality of service parameters, for determining whether or not the requested quality of service is available, characterised in that said determining means is responsive to quality of service requests specifying the desired quality of service as a logical expression involving two or more of said at least two quality of service parameters, wherein the value of at least one of the parameters is made dependent on the value of at least one other of the parameters by the logical expression.

2. The communications system of claim 1, wherein said quality of service requests are received from applications intending to initiate data communications over said network.

3. The communications system of claim 1 or 2, wherein said determining means comprises means for comparing the requested quality of service parameters to facilities provided by the communications link(s) available to the communications system.

4. The communications system of claim 3, wherein the available communications facilities for each communication link are specified in terms of available quality of service parameters.

5. The communications system of claim 1 or 2, wherein a specification of a desired quality of service is written in a pseudo-computer language, which is compiled by said determining means.

6. The communications system of claim 4, wherein a specification of an available quality of service is written in a pseudo-computer language, which is compiled by said determining means.

7. The communications system of claim 1, wherein one or more requested quality of service parameter is represented as a pair of values corresponding to the minimum and maximum of the desired range for those parameters.

8. The communications system of claim 7, wherein said determining means comprises comparing means for ascertaining whether the facilities provided by the communications link(s) available to the communications system lie within the range for each desired parameter.

9. The communications system of claim 8, wherein, in the event that said desired quality of service can be satisfied by the available quality of service, said comparing means produces an agreed range for each quality of service parameter.

10. The communications system of claim 9, further including means for monitoring communications to ensure that they conform to the agreed range for each quality of service parameter.

11. The communications system of claim 1, wherein said determining means further comprises means, responsive to a quality of service request which relates to a route that spans more than one communications system in said network, for communicating with said more than one communications systems, in order to obtain an overall determination of whether the quality of service request can be satisfied.

12. A method for processing requests for a desired quality of service in a communications system for transmitting and/or receiving data over a network, including the steps of receiving desired quality of service requests specifying at least two quality of service parameters, and determining whether or not the requested quality of service is available, characterised in that said determining step is responsive to quality of service requests specifying the desired quality of service as a logical expression involving two or more of said at least two quality of service parameters, wherein the value of at least one of the parameters is made dependent on the value of at least one other of the parameters by the logical expression.

13. The method of claim 12, wherein said quality of service requests are received from applications intending to initiate data communications over said network.

14. The method of claim 12 or 13, wherein said determining step comprises comparing the requested quality of service parameters to facilities provided by the communications link(s) available to the communications system.

15. The method of claim 14, wherein the available communications facilities for each communication link are specified in terms of available quality of service parameters.

16. The method of claim 12, wherein a specification of a desired quality of service is written in a pseudo-computer language, and said determining step further includes the step of compiling said specifications in said pseudo-computer language.

17. The method of claim 15, wherein a specification of an available quality of service is written in a pseudo-computer language, and said determining step further includes the step of compiling said specifications in said computer-language.

18. The method of claim 12, wherein a specification of a desired quality of service is written in a pseudo-computer language, and said determining step further includes the step of compiling said specifications in said pseudo-computer language, and further wherein the compiled quality of service specifications are interpreted to determine whether or not there is a match between the specifications of the desired and available quality of service.

19. The method of claim 12, wherein each requested quality of service parameter is represented as a pair of values corresponding to the minimum and maximum of the desired range for that parameter.

20. The method of claim 19, wherein said step of determining includes ascertaining whether the facilities provided by the communications link(s) available to the communications system lie within the desired range for each parameter.

21. The method of claim 20, wherein, in the event that said desired quality of service can be satisfied by the available quality of service, said step of determining includes producing an agreed range for each quality of service parameter.

22. The method of claim 21, further including the step of monitoring communications to ensure that they conform to the agreed range for each quality of service parameter.

23. The method of claim 12, wherein said determining step further comprises, responsive to a quality of service request which relates to a route that spans more than one communications system in said network, the step of communicating with said more than one communications systems, in order to obtain an overall determination of whether the quality of service request can be satisfied.

24. The method of claim 12, wherein said quality of service parameters include the data transmission rate.

25. The method of claim 12, wherein said quality of service parameters include latency.

26. A system for transmitting and/or receiving data over a network, said system including means for requesting from a communications control system a desired quality of service specifying at least two quality of service parameters, said communications control system determining whether or not the requested quality of service is available, characterised in that said system provides quality of service requests specifying the desired quality of service as a logical expression involving two or more of said at least two quality of service parameters, wherein the value of at least one of the parameters is made dependent on the value of at least one other of the parameters by the logical expression.

* * * * *